United States Patent Office 3,790,543
Patented Feb. 5, 1974

3,790,543
POLYMERIZATION OF ALICYCLIC COMPOUNDS
Gunther Lehnert and Dieter Maertens, Leverkusen, and Josef Witte, Cologne, Germany, assignors to Bayer Aktiengesellschaft, Leverkusen, Germany
No Drawing. Filed Feb. 9, 1972, Ser. No. 224,925
Claims priority, application Germany, Feb. 10, 1971, P 21 06 302.5
Int. Cl. C08f 1/34
U.S. Cl. 260—93.1       17 Claims

ABSTRACT OF THE DISCLOSURE

A process for the polymerization of unsaturated alicyclic compounds, characterized in that at least one cyclic olefine having 4, 5, 7 or more ring carbon atoms and at least one olefinic double bond in the ring is polymerized in the presence of a catalyst system consisting of (a) a halide or oxyhalide of molybdenum or tungsten,
(b) an organometallic tin compound and
(c) optionally a Lewis base as co-catalyst.

---

It is known to polymerize cycloolefins such as cyclobutene, cyclopentene or cyclooctene with catalysts of compounds of metals of Groups IV-B, V-B and VI-B combined with organometallic or metal hydride compounds of metals of Groups I-A, II-A or III-A and alkyl hydride compounds of Group IV-A of the Periodic System of Elements (as given in Handbook of Chemistry and Physics, 47th edition, 1966, page B-3, Chemical Rubber Company, Cleveland, Ohio, U.S.A.) with ring opening to form linear unsaturated polymers.

It is also known to carry out a ring opening polymerization of cycloolefines of the type mentioned above with polymerization activators of molybdenum and tungsten salts and aluminium trihalides. If polymerization is carried out in the absence of solvents and continued to high conversion rates, the products obtained are cross-linked and are technically unusable. Polymerization in solution has previously resulted in low yields and reaction velocities. Better yields are obtained in the presence of oxygen or sulphur containing co-catalysts, but these catalysts have long induction times and polymerization proceeds non-uniformly. Thus in a technical polymerization process solvents have to be used in order to prevent gel formation, as gel formation entails tedious cleaning operations on account of deposits on the reactor surfaces, impedes removal of heat and renders the flow conditions uncontrollable.

This invention relates to a process for polymerizing unsaturated alicyclic compounds wherein at least one cyclic olefine having 4, 5, 7, 8 or more ring carbon atoms and at least one olefinic double bond in the ring is polymerized in the presence of a catalyst of (a) a halide or oxyhalide of molybdenum or tungsten,
(b) an organo tin compound and
(c) optionally a Lewis base as co-catalyst.

Suitable monomers are cyclic olefines which have 4, 5, 7, 8 or more preferably up to 12, ring carbon atoms and 1, 2 or 3 carbon-carbon double bonds in the ring. Examples are cyclobutene, cyclopentene, cycloheptene, cyclooctene, cyclooctadiene (1.5), cyclododecatriene (1.5.9) and norbornene. These olefines may be homopolymerized or copolymerized with each other in any ratio. They may also be copolymerized with other polymerizable unsaturated monomers, e.g. aliphatic dienes having for instance 4 to 8 carbon atoms such as butadiene (1.3), chloroprene, isoprene and pentadiene (1.3). Other polycyclic diolefines or conjugated cyclic diolefines such as norbornadiene, 5-chloro-norbornadiene-2,5, cyclooctadiene (1.3) or aliphatic monoolefines, preferably having 2 to 8 carbon atoms such butene-1, butene-2, pentene-1, propylene and n-octene in quantities up to 50% by weight of the total monomers.

Suitable halides or oxyhalides of tungsten or molybdenum are especially the fluorides, chlorides, bromides and iodides and the corresponding oxy compounds. The following are examples of such compounds: $MoBr_2$, $MoBr_3$, $MoBr_4$, $MoCl_3$, $MoCl_4$, $MoCl_5$, $MoF_6$, $WBr_2$, $WBr_5$, $WBr_6$, $WCl_2$, $WCl_4$, $WCl_5$, $WCl_6$, $WF_6$, $WI_2$, $WI_4$, $MoOCl_4$, $MoOF_4$, $WOBr_4$, $WOCl_4$, $WOF_4$.

Particularly suitable for use as component (a) of the catalyst system is a halide or oxyhalide of tungsten in oxidation state $+6$ ($W^{+6}$) or of molybdenum in oxidation state $+5$ ($Mo^{+5}$).

The organo tin compounds which are used as component (b) in the catalyst of the invention preferably have the formula $X_nSnR_{4-n}$ in which R represents alkyl (preferably containing 1–20 carbon atoms) aryl (preferably having 6–20 carbon atoms), cycloalkyl (preferably containing 3–8 carbon atoms) or alkylaryl (alkyl $C_1$–$C_6$; aryl $C_6$–$C_{20}$), X represents halogen (F, Cl, Br, I) and $n=0, 1, 2$ or $3$.

The following are examples of such compounds: tetramethyl tin, diethyldimethyl tin, tetraethyl tin, dibutyldiethyl tin, tetrabutyl tin, tetraisocumyl tin, tetraphenyl tin, triethyl tin fluoride, triethyl tin chloride, triethyl tin bromide, triethyl tin iodide, diethyl tin difluoride, diethyl tin dichloride, diethyl tin dibromide, diethyl tin diiodide, ethyl tin trifluoride, ethyl tin trichloride, ethyl tin tribromide and ethyl tin triiodide.

The activity of the above described catalyst system of (a) and (b) is generally increased by the addition of a Lewis base. Especially suitable co-catalysts are compounds of N, P, O or S which have a free electron pair on the said atoms, e.g. dialkyl ethers, alkylaryl ethers, diarylethers, triethers, dialkylthioethers, diarylthioethers, alkylaryl thioethers, alkyl ethers of aliphatic glycols, dialkyl ketone, alkylarylketones, diarylketones and esters, any of which above mentioned compounds may be halogenated, N-alkyl or N,N-dialkylcarboxylic acid amides, tertiary alkylamines, tertiary arylamines, tertiary alkylarylamines, alicyclic or aromatic compounds which contain N, O or S, trialkyl or triarylphosphines or "onium halides," e.g. sulphonium halides or oxonium halides.

The following are examples of such electron donating compounds: water, dimethylether, chloromethyl ethyl ether, bis-(2-chloroethyl) ether, methoxycyclohexane, methyl phenyl ether, dibenzylether, ethylene glycol dimethylether, acetone, methyl-(1-chloroethyl) ketone, 3-methylheptanone-(5), 1-phenylpropanon-(1), diphenylketone, trimethoxymethane, butyl acetate, ethyl chloroacetate, dimethylphosphite, triisopropylphosphate, tris-(2-chloroethyl) phosphate, N,N - dimethylformamide, N-methylacetanilide, triethylamine, dimethylaniline, ethyldiphenylamine, tetrahydrofuran, furan, 1,4-dioxane, piperidine, thiophene, triethylphosphine, tricyclohexylphosphine, triphenylphosphine, dimethylsulphide, diphenylsulphide, and ethylphenylsulphide.

The process may be carried out with or without solvents.

Solvents suitable for the process according to the invention are inert organic solvents such as aliphatic or cycloaliphatic hydrocarbons containing 5 to 12 carbon atoms, e.g. pentane, heptane, cyclohexane or commercial petroleum hydrocarbon fractions of 60 to 200° C., aromatic hydrocarbons such as benzene and toluene and halogenated aliphatic or aromatic hydrocarbons such as chlorobenzene or mixtures of the above mentioned solvents.

The polymerization process is generally carried out by preparing a solution of the monomers in one of the above mentioned solvents and adding the catalyst components to the solution. The concentration of monomers in the solution is preferably about 5 to 40 percent by weight, most preferably 15 to 30% by weight, but polymerization may also be carried out with higher monomer concentrations. The sequence in which the catalyst components are added is immaterial to the process of the invention. The catalyst may, of course, be prepared first in the absence of monomers, the monomer being then finally added to the catalyst solution. A protective gas atmosphere such as nitrogen or argon is preferably employed in order to exclude substantial quantities of moisture and atmospheric oxygen. The pressure employed is generally atmospheric pressure although pressures higher or lower than 1 atmosphere may be employed. Polymerization generally proceeds at temperatures of between —90 and +80° C. and is preferably carried out between —40 and +40° C.

The quantity of molybdenum or tungsten compound used is generally 0.01 to 5 mmol per 100 g. of monomer and is preferably 0.2 to 0.8 mmol per 100 g. of monomer. The molar ratio of catalyst components (a):(b) preferably is between 1:0.05 and 1:10, most preferably between 1:0.2 and 1:4. The quantity of co-catalysts used depends on the nature of the co-catalyst. The molar ratio of (a):(c) is generally 1:0.1 to 1:8 for water and 1:0.1 to 1:20 for other compounds which contain N, P, O or S atoms and at least one free electron pair on the said atoms.

After polymerization, the catalyst may be inactivated, e.g. by the addition of alcohols such as methanol, ethanol or isopropanol or organic acids such as formic acid or stearic acid. It is advisable to add chelating compounds such as ethanolamine, N-methylethanolamine or ethylene diamine in order to prevent significant quantities of metals of the catalyst system from remaining in the polymer material. The polymers may be stabilized against the action of oxygen by the addition of known antioxidants such as 2,6-di-tert.-butyl-4-methylphenol, 2,2'-dihydroxy-3,3'-di-tert.-butyl-5,5'-dimethyl-diphenylmethane or phenyl-$\beta$-naphthylamine.

The polymers may be precipitated from their solutions by the usual methods of adding non-solvents such as lower alcohols e.g. methanol or ethanol. For technical processes it is preferred to isolate the polymers by introducing the inactivated and stabilized polymer solution into hot water, the solvent and water then distilling off as an azeotropic mixture. The polymer is obtained in the form of lumps. The rubber lumps still moist with water are dried e.g. in a drying cupboard, on a belt conveyor drier or in a screw.

The polymers obtained have a high cis double bond content or trans double bond content; this depends on the reaction conditions and can be determined from the IR spectra. The polymers may be cross-linked with known vulcanizing agents and are suitable for making all usual rubber products, such as automobile tires, rubber hose, etc.

This invention provides a simple process for the polymerization of cyclic olefines into open chain unsaturated polymers, which in contrast to the known processes may also be carried out in solution with very high yields. Another advantage is that the catalyst system is comparatively insensitive to polymerization inhibitors, e.g. water.

Alicyclic olefines from large scale production generally contain small quantities of ethers, cyclopentadiene and open chain diolefines which can be removed only with very great technical effort and loss of product. The above mentioned contaminants are powerful catalyst poisons for the previously known catalysts and severely reduce polymerization yields or may even prevent polymerization completely. With the catalyst system according to the invention, on the other hand, these compounds are active co-catalysts or copolymerizers.

In contrast to catalysts which contain aluminium alkyl compounds, the catalyst of the invention is not self-igniting. The polymerization process is therefore easier to carry out and safer than the known processes. The polymerization process according to the invention provides the further advantage to predetermine the microstructure and properties of the polymers as desired within wide limits by suitably selecting the catalyst composition and the reaction conditions. When, for example, polymerization is carried out in a solvent, the gel content of the polymer is 0% even at high polymerization conversions and the ratio of cis double bonds and trans double bonds of the polymer may be adjusted to any desired value by varying the polymerization temperature. If polymerization is carried out at —90° to —20° C., the polymers contain mainly cis double bonds (preferably 60 to 90% of the total of double bonds) whereas polymerization at —10° to +40° C. yields predominantly (preferably 70 to 95% of the total of double bonds) trans double bonds.

In the following examples percent of double bonds are based in the total of double bonds present. If trans double bonds are given the remainder is cis and vice versa.

EXAMPLE 1

The experiment was carried out in a 500 ml. pressure bottle sealed with a crown cork, which was thoroughly dried and filled with $N_2$ which was free from $O_2$. 0.25 mmol of $WCl_6$ and 0.5 mmol of $Sn(C_2H_5)_4$ were added to a solution of 50 ml. of commercial cyclopentene in 150 ml. of anhydrous, oxygen-free toluene in the bottle. The temperature was kept at 0° C. by external cooling. Polymerization was terminated after 4 hours by the addition of 3 ml. of a 10% solution of tributylamine in toluene, and the polymer was precipitated in 1 l. of methanol after the addition of 0.3 g. of 2,2'-di-hydroxy-3,3'-di-tert.-butyl-5,5'-dimethyl-diphenylmethane.

After drying in a vacuum cupboard at 50° C., the yield was 53.4% of the theory
Trans double bonds: 89.2% (IR spectroscopy)
Intrinsic viscosity [$\eta$]: 2.55 (determined in toluene at 25° C.)
Gel content: none.

EXAMPLE 2

The same procedure was employed as in Example 1 but the catalyst consisted of 0.25 mmol of $WCl_6$ and 0.5 mmol of $(C_4H_9)_2Sn(C_2H_5)_2$. Polymerization was carried out at 20° C.

Yield: 47.5% of the theory
Trans double bonds: 90.6%
Intrinsic viscosity [$\eta$]: 2.8 (determined in toluene at 25° C.)
Gel content: none.

EXAMPLE 3

The same procedure was employed as in Example 1 except that polymerization was carried out in chlorobenzene. The polymerization time was 4 hours at —30° C.

Yield: 36.6% of the theory
Trans double bonds: 47.7%
Intrinsic viscosity [$\eta$]: 5.57 (determined in toluene at 25° C.)
Gel content: none.

EXAMPLE 4

Polymerization was carried out as described in Example 1 but the polymerization mixture contained 10 p.p.m. of water and the polymerization temperature was 20° C.

Yield: 74% of the theory
Trans double bonds: 91.5%
Intrinsic viscosity [$\eta$]: 2.24 (determined in toluene at 25° C.)
Gel content: none.

EXAMPLE 5

The procedure described in Example 1 was repeated but polymerization was carried out in the absence of solvents and with half the catalyst quantity at −30° C.

Gel content: 80% by weight based on total polymer
Yield: 87% of the theory
Trans double bonds: 18.5%

EXAMPLE 6

Example 4 was repeated but polymerization was carried out at 30° C.

Yield: 61.8% of the theory
Trans double bonds: 91%
Intrinsic viscosity $[\eta]$: 1.42 (determined in toluene at 25° C.)
Gel content: none.

EXAMPLE 7

The procedure described in Example 1 was employed except that the catalyst consisted of 0.25 mmol of $WCl_6$, 0.5 mmol of diethylether and 0.5 mmol of $Sn(C_2H_5)_4$. Polymerization was carried out for 4 hours at room temperature.

Yield: 74% of the theory
Trans double bonds: 91.2%
Intrinsic viscosity $[\eta]$: 1.81 (determined in toluene at 25° C.)
Gel content: none.

EXAMPLE 8

Employing the procedure described in Example 1, polymerization was carried out for 4 hours at room temperature using a catalyst of 0.25 mmol $WCl_6$, 1 mmol thiophene and 0.5 mmol $Sn(C_2H_5)_4$.

Yield: 68.5% of the theory
Trans double bonds: 90.4%
Intrinsic viscosity $[\eta]$: 2.25 (determined in toluene at 25° C.)
Gel content: none.

EXAMPLES 9–20

The method described in Example 1 was employed. The tungsten compound was added to the solution of cyclopentene in toluene first, followed optionally by the electron donor compound, and $Sn(C_2H_5)_4$ (tin alkyl) was added last. After termination of polymerization, the product was recovered as in Example 1. The catalyst components, proportion of components, solvent and temperature were varied.

Details of the experimental conditions and results are shown in Table 1.

EXAMPLE 21

The procedure employed was the same as in Example 1. Polymerization was carried out for 3 hours at 20° C. using a catalyst of 0.2 mmol of $MoCl_5$ and 0.2 mmol of $Sn(C_2H_5)_4$.

Yield: 61% of the theory
Trans double bonds: 91.4%
Intrinsic viscosity $[\eta]$: 2 (determined in toluene at 25° C.).

EXAMPLE 22

Employing the procedure described in Example 1, polymerization was carried out for 3 hours at 20° C. using a catalyst of 0.2 mmol of $MoCl_5$ and 4 mmol of $Sn(C_2H_5)_4$.

Yield: 67% of the theory
Trans double bonds: 90.1%
Intrinsic viscosity $[\eta]$: 4.13 (determined in toluene at 25° C.).

EXAMPLE 23

Employing the procedure described in Example 1, polymerization was carried out for 3 hours at 20° C. using a catalyst consisting of 0.2 mmol of $MoCl_5$ and 0.6 mmol of $Sn(C_2H_5)_4$.

Yield: 61% of the theory
Trans double bonds: 91.4%
Intrinsic viscosity $[\eta]$: 1.96 (determined in toluene at 25° C.).

EXAMPLES 24–30

The method described in Example 1 was employed. The molybdenum compound was added to the solution of cyclopentene in toluene first, and then the electron donor compound and lastly $Sn(C_2H_5)_4$ (tin alkyl). After polymerization, the product was worked up as in Example 1.

Details of the experimental conditions and results are shown in Table 2.

EXAMPLE 31

The method described in Example 1 was employed but 10 ml. of cyclooctene in 100 ml. of toluene were polymerized for 2 hours at −30° C. The catalyst was prepared from 0.175 mmol of $WCl_6$, 0.35 mmol of diethylether and 0.35 mmol of $Sn(C_2H_5)_4$. A polyoctenamer having mainly cis double bonds was obtained in a yield of 26% of the theory.

EXAMPLE 32

10 ml. of cycloheptene in 100 ml. of toluene were polymerized for 2 hours at +20° C. by the method described in Example 1. The catalyst was prepared from 0.175 mmol of $WCl_6$, 0.35 mmol of $O(C_2H_5)_2$ and 0.35 mmol of $Sn(C_2H_5)_4$.

A polyheptenamer containing mainly trans double bonds was obtained in a yield of 50% of the theory.

EXAMPLE 33

The general method of Example 1 was used. A catalyst from 0.19 mmol of $WCl_6$, 0.38 mmol diethylether and 0.38 mmol of $Sn(C_4H_9)_4$ was prepared in 150 ml. toluene and the catalyst was kept for 10 minutes at 20° C. Subsequently 50 ml. of cyclopentene were added and the polymerization mixture was kept at 15 to 20° C. for 3 hours. Polymer yield after recovery as in Example 1 was 66.9% of the theoretical yield. 90% of the double bonds of the polymer were in the trans-configuration, intrinsic viscosity $[\eta]$: 3.9 (determined in toluene at 25° C.), gel content: 0%.

EXAMPLE 34

Polymerization was carried out as in Example 1, however, a solution of 50 ml. of cyclooctadiene-(1.5) in 170 ml. of toluene was prepared and 0.26 mmol $WCl_6$, 0.52 mmol diethylether and 0.52 mmol $Sn(C_2H_5)_4$ were added. After 4 hours at 15 to 20° C. a polymer yield of 91.8% of the theoretical was obtained.

Percentage of trans-double bonds: 91.7
Intrinsic viscosity $[\eta]$: 2.1 (determined in toluene at 25° C.)
Gel content. 0%.

EXAMPLE 35

According to the method of Example 1 20 g. of trans-trans-trans-cyclododecatriene-(1.5.9) dissolved in 100 ml. of toluene were polymerized with a catalyst of 0.4 mmol $WCl_6$, 0.8 mmol diethylether and 0.4 mmol $Sn(C_2H_5)_4$. Polymerization was carried out for 2 hours at 0° C. and subsequently for 2 hours at 40° C.

Yield 24% of the theoretical, trans-double bonds: 95.8%
Intrinsic viscosity $[\eta]$: 0.8 (determined in toluene at 25° C.)
Gel content: 0%.

EXAMPLE 36

According to the method of Example 1 a catalyst of 0.22 mmol $WCl_6$, 0.44 mmol diethylether and 0.44 mmol $Sn(C_4H_9)_4$ in 170 ml. toluene was prepared and left standing for 30 minutes at 25 to 30° C. Subsequently 50 ml. of cyclooctadiene-1,5 were added. After 4 hours polymerization at 25 to 30° C. a yield of 92.8% of the theoretical was obtained, trans-double bonds 78.6%.

Intrinsic viscosity [$\eta$]: 1.3 (determined in toluene at 25° C.)
Gel content: 0%.

8. The process of claim 1 wherein said polymerization is carried out at a temperature of −40 to 40° C.

9. The process of claim 1 wherein at least one member of the group consisting of cyclobutene, cycloheptene and cyclooctene is polymerized.

10. The process of claim 1 wherein cyclopentene is polymerized.

TABLE I

| 1  | 2    | 3            | 4            | 5       | 6     | 7       | 8 | 9   | 10   | 11   | 12   |
|----|------|--------------|--------------|---------|-------|---------|---|-----|------|------|------|
| 9  | WCl₆ |              | Sn(C₂H₅)₄    | 1:—:1   | 0.715 | Toluene | 4 | −30 | 25.4 | 30.6 |      |
| 10 | WCl₆ |              | Sn(C₂H₅)₄    | 1:—:2   | 0.357 | ...do...| 4 | −30 | 67.0 | 12.9 | 4.26 |
| 11 | WCl₆ | O(C₂H₅)₂     | Sn(C₂H₅)₄    | 1:2:2   | 0.715 | ...do...| 4 | −30 | 42.8 | 32.9 | 5.70 |
| 12 | WCl₆ | Thiophene    | Sn(C₂H₅)₄    | 1:1:2   | 0.715 | ...do...| 4 | −30 | 44.2 | 39.1 | 4.07 |
| 13 | WCl₆ | O(C₂H₅)₂     | Sn(C₂H₅)₄    | 1:2:2   | 0.35  | ...do...| 4 | −15 | 79.4 | 70.1 | 4.99 |
| 14 | WCl₆ |              | Sn(C₂H₅)₄    | 1:—:10  | 0.715 | ...do...| 4 | 0   | 33.5 | 85.6 | 2.6  |
| 15 | WCl₆ | H₂O          | Sn(C₂H₅)₄    | 1:0.5:2 | 0.715 | ...do...| 4 | 20  | 74.0 | 91.5 | 2.24 |
| 16 | WCl₆ | H₂O          | Sn(C₂H₅)₄    | 1:0.5:3 | 0.715 | ...do...| 4 | 20  | 34.8 | 89.4 | 2.49 |
| 17 | WCl₆ | O(C₂H₅)₂     | Sn(C₂H₅)₄    | 1:0.2:2 | 0.715 | ...do...| 4 | 20  | 76.3 | 90.9 | 2.15 |
| 18 | WCl₆ | THF          | Sn(C₂H₅)₄    | 1:1:2   | 0.715 | ...do...| 4 | 20  | 30.5 | 88.0 | 3.08 |
| 19 | WCl₆ | Thiophene    | Sn(C₂H₅)₄    | 1:5:2   | 0.715 | ...do...| 4 | 20  | 68.5 | 90.4 | 2.25 |
| 20 | WCl₆ | O(C₂H₅)₂     | Sn(C₂H₅)₄    | 1:1:2   | 0.715 | Benzene | 4 | 20  | 76.1 | 90.0 | 3.56 |

Explanation.—1=Example number; 2=Tungsten compound; 3=Electron donor; 4=Tin Compound; 5=Molar ratio of tungsten:donor:tin; 6=Mmol of tungsten/100 g. of monomer; 7=Solvent; 8=Polymerization time in hours; 9=Polymerization temperature in ° C.; 10=Yield in percent of the theory; 11=Trans double bond content in percent of total double bonds, remainder:cis; 12=Vircosity ($\eta$) determined in toluene at 25° C.; THF=Tetrahydrofuran.

TABLE 2

| 1  | 2     | 3                          | 4         | 5       | 6   | 7       | 8 | 9  | 10   | 11   | 12   |
|----|-------|----------------------------|-----------|---------|-----|---------|---|----|------|------|------|
| 24 | MoCl₅ | H₂O                        | Sn(C₂H₅)₄ | 1:0.5:5 | 1   | Toluene | 3 | 20 | 53   | 90.5 | 3.35 |
| 25 | MoCl₅ | O(C₂H₅)₂                   | Sn(C₂H₅)₄ | 1:2:3   | 0.5 | ...do...| 3 | 20 | 59   | 90.6 | 3.49 |
| 26 | MoCl₅ | O(CH₂—CH₂Cl)₂              | Sn(C₂H₅)₄ | 1:5:2   | 0.5 | ...do...| 3 | 20 | 73   | 90.4 | 3.72 |
| 27 | MoCl₅ | Dioxane                    | Sn(C₂H₅)₄ | 1:0.3:3 | 0.5 | ...do...| 3 | 20 | 57   | 90.7 | 3.21 |
| 28 | MoCl₅ | Tetramethylethylenediamine | Sn(C₂H₅)₄ | 1:0.5:3 | 0.5 | ...do...| 3 | 20 | 57.5 | 84.1 | 3.79 |
| 29 | MoCl₅ | Thiophene                  | Sn(C₂H₅)₃ | 1:0.5:3 | 0.5 | ...do...| 3 | 20 | 58   | 88.7 | 3.39 |
| 30 | MoCl₅ | Triphenylphosphine         | Sn(C₂H₅)₄ | 1:0.5:3 | 0.5 | ...do...| 3 | 20 | 40   | 89.2 | 4.76 |

Explanation.—1= Example number; 2=Molybdenum compound; 3=Electron donor; 4=Tin compound; 5=Molar ratio of molybdenum: donor: tin; 6=Mmol of molybdenum/100 g. of monomer; 7=Solvent; 8=Polymerization time in hours; 9=Polymerization temperature; 10=Yield in percent of theory; 11=Trans double bond content in percent of the total double bonds, remainder: cis double bonds; 12=Viscosity number ($\eta$) determined in toluene at 25° C.

We claim:
1. A process for polymerizing at least one cyclic hydrocarbon having 4, 5 or 7 to 12 ring carbon atoms and at least one olefinic double bond in the ring which comprises polymerizing said cyclic hydrocarbon at a temperature of −90 to 80° C. in the presence of a catalytic amount of a catalyst composition consisting essentially of
   (a) a molybdenum or tungsten halide or oxyhalide and
   (b) a compound of the formula

$$X_nSnR_{4-n}$$

wherein R is alkyl having 1 to 20 carbon atoms, cycloalkyl having 3 to 8 carbon atoms, aryl having 6 to 20 carbon atoms or alkaryl having 1 to 6 carbon atoms in the alkyl moiety and 6 to 20 carbon atoms in the aryl moiety, X is halogen and n is zero, 1, 2, or 3,
the molar ratio of (a):(b) being 1:0.5 to 1:10 and there being 0.01 to 5 mmol of (a) per 100 g. of cyclic hydrocarbon.

2. The process of claim 1 wherein (a) is a molybdenum or tungsten halide of pentavalent molybdenum or hexavalent tungsten.

3. The process of claim 1 wherein (a) is WCl₆, WF₆, WBr₆, WOCl₄, MoCl₅ or MoOCl₄.

4. The process of claim 1 wherein (b) is Sn(C₂H₅)₄, Sn(C₄H₉)₄ or (C₄H₉)₂Sn(C₂H₅)₂.

5. The process of claim 1 wherein said polymerization is carried out in the presence of an inert solvent.

6. The process of claim 5 wherein the monomer concentration in the solvent is 5 to 40% by weight.

7. The process of claim 5 wherein the monomer concentration in the solvent is 15 to 30% by weight.

11. A process for polymerizing at least one cyclic hydrocarbon having 4, 5 or 7 to 12 ring carbon atoms and at least one olefinic double bond in the ring which comprises polymerizing said cyclic hydrocarbon at a temperature of −90 to 80° C. in the presence of a catalytic amount of a catalyst composition comprising
   (a) a molybdenum or tungsten halide or oxyhalide;
   (b) a compound of the formula $$X_nSnR_{4-n}$$

wherein R is alkyl having 1 to 20 carbon atoms, cycloalkyl having 3 to 8 carbon atoms, aryl having 6 to 20 carbon atoms or alkaryl having 1 to 6 carbon atoms in the alkyl moiety and 6 to 20 carbon atoms in the aryl moiety, X is halogen and n is zero, 1, 2, or 3 and
   (c) a Lewis base which is a compound containing N, P, O or S wherein there is at least one free electron pair on said N, P, O or S, the molar ratio of (a):(b) being 1:0.5 to 1:10,
the molar ratio of (a):(c) when (c) is water being 1:0.1 to 1:8 and the molar ratio of (a):(c) when (c) is not water being 1:0.1 to 1:20 and there being 0.01 to 5 mmol of (a) per 100 g. of cyclic hydrocarbon.

12. The process of claim 11 wherein (a) is a molybdenum or hexavalent tungsten.

13. The process of claim 11 wherein (a) is WCl₆, WF₆, WBr₆, WOCl₄, MoCl₆ or MoOCl₄.

14. The process of claim 11 wherein (b) is Sn(C₂H₅)₄, Sn(C₄H₉)₄ or (C₄H₉)₂Sn(C₂H₅)₂.

15. The process of claim 11 wherein (c) is water, a dialkyl ether, an alkyl aryl ether, a diaryl ether, trimethoxy methane, a dialkyl thioether, a diaryl thioether, an alkyl aryl thioether, an alkyl ether of an aliphatic glycol, a dialkyl ketone, an alkyl aryl ketone, a diaryl ketone, an alkyl acetate, a halide of one of the aforesaid compounds, an N-alkyl carboxylic acid amide, an N,N-dialkyl carboxylic acid amide, a tertiary alkylamine, a tertiary arylamine, a tertiary alkyl arylamine, an alicyclic or aromatic compound containing N, O or S, a trialkyl phosphine, a triaryl phosphine, a sulphonium halide or an oxonium halide.

16. The process of claim 11 wherein the molar ratio of (a):(b) is 1:0.2 to 1:4.

17. The process of claim 11 wherein the molar ratio of (a):(b) is 1:0.2 to 1:4.

References Cited
UNITED STATES PATENTS

| | | | |
|---|---|---|---|
| 3,459,725 | 8/1969 | Natta et al. | 260—93.1 |
| 3,657,208 | 4/1972 | Judy | 260—88.2 R |

STANFORD M. LEVIN, Primary Examiner

U.S. Cl. X.R.

260—33.6 PQ, 88.2 B, F; 252—429 B, C